(12) United States Patent
Fujisawa et al.

(10) Patent No.: US 8,283,830 B2
(45) Date of Patent: Oct. 9, 2012

(54) ROTATING ELECTRIC MACHINE AND DRIVE SYSTEM THEREOF

(75) Inventors: Yukinari Fujisawa, Yachiyo (JP); Toshihiko Sakai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 346 days.

(21) Appl. No.: 12/511,732

(22) Filed: Jul. 29, 2009

(65) Prior Publication Data
US 2010/0133944 A1 Jun. 3, 2010

(30) Foreign Application Priority Data
Nov. 28, 2008 (JP) ................................. 2008-304159

(51) Int. Cl.
*H02K 3/00* (2006.01)
(52) U.S. Cl. ........................................ 310/184; 310/180
(58) Field of Classification Search .......... 310/184–185, 310/166, 159, 208, 195
See application file for complete search history.

(56) References Cited

U.S. PATENT DOCUMENTS

| | | | | |
|---|---|---|---|---|
| 2,575,716 A * | 11/1951 | Kilgore | ........................... | 318/771 |
| 3,949,254 A * | 4/1976 | Woll et al. | ...................... | 310/198 |
| 4,307,311 A * | 12/1981 | Grozinger | ..................... | 310/179 |
| 4,402,129 A * | 9/1983 | Kreuzer et al. | ................. | 29/596 |
| 4,743,828 A * | 5/1988 | Jahns et al. | .................... | 318/810 |
| 5,233,280 A * | 8/1993 | Ghosh | ........................... | 318/800 |
| 6,313,593 B1 * | 11/2001 | Matsubara et al. | ........... | 318/434 |
| 6,552,463 B2 * | 4/2003 | Oohashi et al. | ................ | 310/207 |
| 7,834,506 B2 * | 11/2010 | Hattori | ........................... | 310/180 |
| 2007/0200346 A1 * | 8/2007 | Kanazawa et al. | ........... | 290/40 B |

FOREIGN PATENT DOCUMENTS

| | | |
|---|---|---|
| CN | 1725626 A | 1/2006 |
| JP | 2001-169519 A | 6/2001 |
| JP | 2005-086879 A | 3/2005 |

OTHER PUBLICATIONS

Chinese Office Action dated Oct. 10, 2011 and translation thereof (7 pages).

* cited by examiner

*Primary Examiner* — Burton Mullins
(74) *Attorney, Agent, or Firm* — Crowell & Moring LLP

(57) ABSTRACT

In a rotating electric machine, each phase of a plurality of three-phase windings is divided into a plurality of partial windings, disposed on a stator core. For example, the partial windings of the U-phase are distributively arranged on four U-phase winding areas $2U_1$ to $2U_4$, and on each of these winding areas, two partial windings overlap through a pair of slots between which two teeth are interposed. At each coincident location of a pair of slots, two partial windings of different three-phase windings overlap. For example, a pair of slots on the U-phase winding area $2U_1$, a partial winding $U_{A1}$ of a U-phase winding $U_A$ and a partial winding $U_{B3}$ of a U-phase winding $U_B$ overlap. At a pair of slots on the U-phase winding area $2U_1$, a partial winding $U_{G2}$ of a U-phase winding $U_G$ and a partial winding $U_{B2}$ of a U-phase winding $U_B$ overlap.

13 Claims, 7 Drawing Sheets

⊗ : CURRENT FLOW DIRECTION FROM THE FRONT OF THE PAPER TO THE BACK THEREOF.
⊙ : CURRENT FLOW DIRECTION FROM THE BACK OF THE PAPER TO THE FRONT THEREOF.

⊗ : CURRENT FLOW DIRECTION FROM THE FRONT OF THE PAPER TO THE BACK THEREOF.

⊙ : CURRENT FLOW DIRECTION FROM THE BACK OF THE PAPER TO THE FRONT THEREOF.

FIG.4

|  |  | LOCATIONS | | |
|---|---|---|---|---|
|  |  | FIRST SERIES | SECOND SERIES | THIRD SERIES |
| WINDINGS | U$_A$ | 108-106 | 131-133 | 131-129 |
|  | U$_B$ | 113-111 | 104-106 | 108-106 |
|  | U$_C$ | 135-133 | 122-124 | 122-120 |
|  | U$_D$ | 135-133 | 131-133 | 104-102 |
|  | U$_E$ | 126-124 | 113-115 | 113-111 |
|  | U$_F$ | 131-129 | 122-124 | 126-124 |
|  | U$_G$ | 117-115 | 104-106 | 104-102 |
|  | U$_H$ | 117-115 | 113-115 | 122-120 |

FIG.5

|  |  | OVERLAPPING DIVIDED WINDINGS | | |
|---|---|---|---|---|
|  |  | FIRST SERIES | SECOND SERIES | THIRD SERIES |
| WINDINGS | U$_A$ | U$_{B3}$ | U$_{D2}$ | U$_{F1}$ |
|  | U$_B$ | U$_{E3}$ | U$_{G2}$ | U$_{A1}$ |
|  | U$_C$ | U$_{D1}$ | U$_{F2}$ | U$_{H3}$ |
|  | U$_D$ | U$_{C1}$ | U$_{A2}$ | U$_{G3}$ |
|  | U$_E$ | U$_{F3}$ | U$_{H2}$ | U$_{B1}$ |
|  | U$_F$ | U$_{A3}$ | U$_{C2}$ | U$_{E1}$ |
|  | U$_G$ | U$_{H1}$ | U$_{B2}$ | U$_{D3}$ |
|  | U$_H$ | U$_{G1}$ | U$_{E2}$ | U$_{C3}$ |

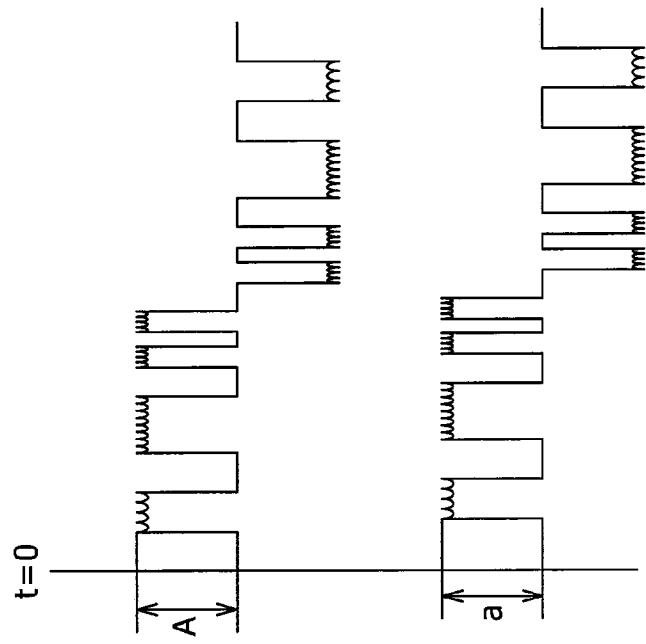
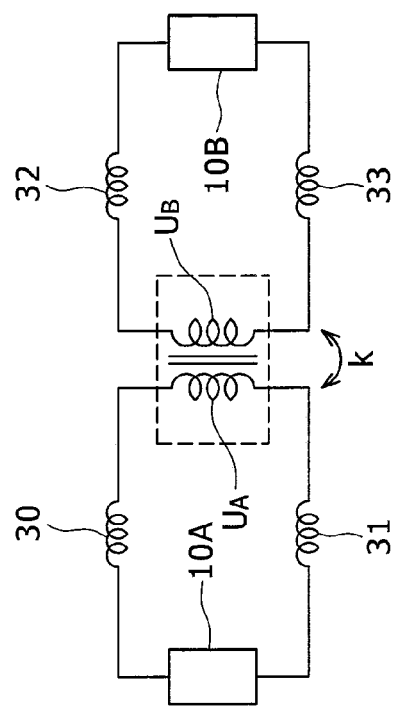
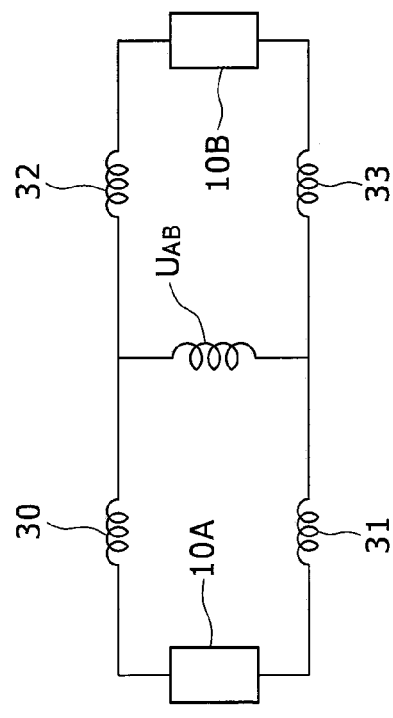

ROTATING ELECTRIC MACHINE AND DRIVE SYSTEM THEREOF

BACKGROUND OF THE INVENTION

The present invention relates to a winding structure of a stator in a rotating electric machine such as a multiphase AC motor, and more particularly to a winding structure of a stator in a rotating electric machine driven by a plurality of inverters and a drive system of the rotating electric machine.

As a conventional machine, there is known a rotating electric machine such as a servomotor, which is driven by using an inverter circuit thereof. In this kind of rotating electric machine, the inverter circuit thereof feeds a current in a predetermined phase relationship to each of three-phase (UVW-phase) stator windings disposed on a motor stator for rotatably driving a rotor. For the purpose of realizing larger output, it has been proposed to provide a rotating electric machine wherein a plurality of inverter circuits are used, wherein a UVW-phase stator winding is arranged for each of the inverter circuits, and wherein each of the UVW-phase stator windings is divided into a plurality of windings, which are disposed on a motor stator (disclosed in Japanese Patent Application No. 2005-86879, for example).

In a technique disclosed in Japanese Patent Application No. 2005-86879, two sets of UVW-phase stator windings are used as windings 1 and 2, each of the windings 1 and 2 is divided into two windings, a total of 48 slots disposed alternately with teeth on a stator are grouped into four ranges at 90° mechanical angle intervals, and the four ranges thus grouped are designated as the first to fourth quadrants in circumferential order. One of the two divided windings of the winding 1 is disposed in the first quadrant, and the other of the two divided windings of the winding 1 is disposed in the third quadrant opposed to the first quadrant. Likewise, one of the two divided windings of the winding 2 is disposed in the second quadrant, and the other of the two divided windings of the winding 2 is disposed in the fourth quadrant opposed to the second quadrant.

In the above-mentioned arrangement, by dividing each of the windings 1 and 2 into two windings and disposing these windings thus divided in different quadrants (angular ranges), it is intended to increase the output of a rotating electric machine; and further, by arranging the windings 1 and 2 so as not to spatially overlap each other, it is also intended to prevent magnetic flux interference between the windings 1 and 2.

SUMMARY OF THE INVENTION

However, in the above technique disclosed in Japanese Patent Application No. 2005-86879, there is a restriction imposed on the relationship between the number of parallel circuits (the number of UVW-phase stator windings) and the number of slots (the number of poles) with respect to spatial winding arrangement for circumventing magnetic flux interference between windings. In general, as the number of parallel circuits is increased, it is required to increase the number of slots accordingly.

On the other hand, to provide a rotating electric machine featuring smaller size and lower moment of inertia for improvements in economy and acceleration performance in practical applications, it is desired to decrease the inside diameter of a stator. For this purpose, however, the dimensions of slots or teeth of a stator core must be decreased. In cases where it is required to decrease these dimensions below a certain level, there arises considerable difficulty in fabrication, resulting in a problem of impracticability of the technique mentioned above.

It is therefore an object of the present invention to overcome the above problem by providing a winding structure of a rotating electric machine and a drive system thereof which can realize larger output, smaller size, and lower moment of inertia while circumventing an increase in the number of slots.

In accomplishing this object of the present invention and according to one aspect thereof, there is provided a winding structure of a rotating electric machine, comprising: a stator core; and a plurality of multiphase windings formed thereon; wherein each phase winding of each multiphase winding is divided into a plurality of partial windings, which are disposed at different locations on the stator core; and wherein, at each location on the stator core for partial winding disposition, a plurality of partial windings of identical-phase windings of different multiphase windings are disposed overlappingly.

Further, according to another aspect of the present invention, there is provided a winding structure of a rotating electric machine wherein, at each location on the stator core for partial winding disposition, a plurality of partial windings are wound through a pair of slots between which a predetermined number of teeth are interposed.

Furthermore, according to another aspect of the present invention, there is provided a winding structure of a rotating electric machine wherein a plurality of winding areas each including a plurality of locations on the stator core for partial winding disposition are provided at equally spaced intervals, and wherein each phase winding of the multiphase windings is so provided that the partial windings thereof are distributively arranged on different winding areas.

Still further, according to another aspect of the present invention, there is provided a winding structure of a rotating electric machine wherein each of the winding areas includes a plurality of locations where a plurality of partial windings of different-phase windings are disposed.

Still further, according to another aspect of the present invention, there is provided a winding structure of a rotating electric machine wherein the stator core has a total of 36 slots, and a total of eight three-phase windings are provided as multiphase windings.

Still further, according to another aspect of the present invention, there is provided a winding structure of a rotating electric machine wherein each phase winding includes three partial windings.

Moreover, in accomplishing the above-mentioned object of the present invention, there is provided a drive system of a rotating electric machine wherein each of the multiphase windings is driven by each of a plurality of servo amplifiers to be used with inverters.

In accordance with the present invention, even if the number of three-phase windings on the stator core is increased, it is possible to suppress an increase in the number of slots on the stator core since a plurality of identical-phase partial windings are disposed at each same location on the stator core. Further, a plurality of identical-phase partial windings at each same location on the stator core are disposed as a plurality of identical-phase partial windings of different three-phase windings to suppress interference on the different three-phase windings, thereby allowing reliable control of each winding. Thus, the present invention makes it possible to provide a rotating electric machine featuring larger output, smaller size, and lower moment of inertia with a relatively small number of slots.

BRIEF DESCRIPTION OF THE DRAWINGS

FIG. 4 shows, in tabular form, the locations of partial windings of U-phase windings of respective UVW-phase windings in FIG. 1;

FIG. 5 shows, in tabular form, overlapping conditions of respective partial windings of U-phase windings in FIG. 1;

FIGS. 9A to 9C are explanatory diagrams regarding interference in the stator winding structure of the comparative example presented in FIG. 8.

DETAILED DESCRIPTION OF THE PREFERRED EMBODIMENTS

The present invention will now be described below in detail by way of example with reference to the accompanying diagrams. First, the following describes a concrete example of a rotating electric machine according to the present invention.

Figure 2:
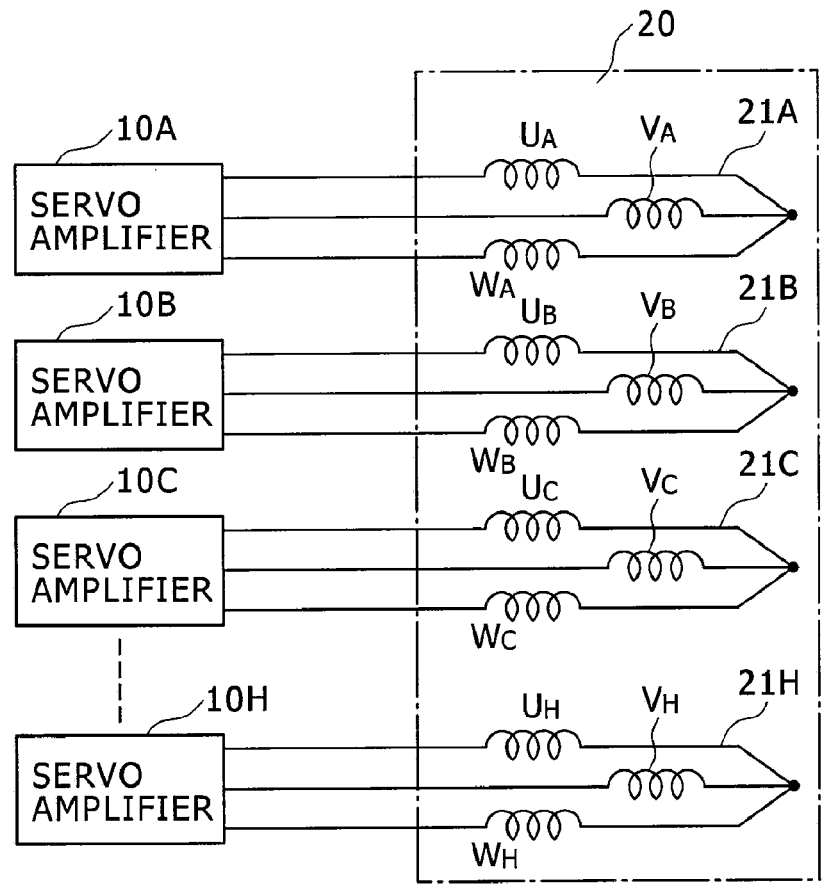
FIG. 2 is a system configuration diagram showing a preferred embodiment of a drive system of the rotating electric machine according to the present invention.

FIG. 2 shows a system configuration of a drive system of the rotating electric machine according to a preferred embodiment of the present invention. Reference characters 10A to 10H indicate servo amplifiers, reference character 20 indicates a stator of the rotating electric machine, reference characters 21A to 21H indicate three-phase windings, reference characters $U_A$ to $U_H$ indicate U-phase windings, reference characters $V_A$ to $V_H$ indicate V-phase windings, and reference characters $W_A$ to $W_H$ indicate W-phase windings.

With reference to FIG. 2, the stator 20 of the rotating electric machine is provided with a plurality of Y-connection windings of three phases including U phase, V phase, and W phase (three-phase windings), and each of the three-phase windings is driven by an individual servo amplifier associated therewith. In an example illustrated in FIG. 2, a total of eight three-phase windings 21A to 21H are provided.

More specifically, as shown in FIG. 2, the three-phase winding 21A including the U-phase winding $U_A$, V-phase winding $V_A$, and W-phase winding $W_A$ disposed on the stator 20 is supplied with power from the servo amplifier 10A, the three-phase winding 21B including the U-phase winding $U_B$, V-phase winding $V_B$, and W-phase winding $W_B$ is supplied with power from the servo amplifier 10B, the three-phase winding 21C including the U-phase winding $U_C$, V-phase winding $V_C$, and W-phase winding $W_C$ is supplied with power from the servo amplifier 10C, and so on. Lastly, in the same manner, the three-phase winding 21H including the U-phase winding $U_H$, V-phase winding $V_H$, and W-phase winding $W_H$ is supplied with power from the servo amplifier 10H.

Figure 3:
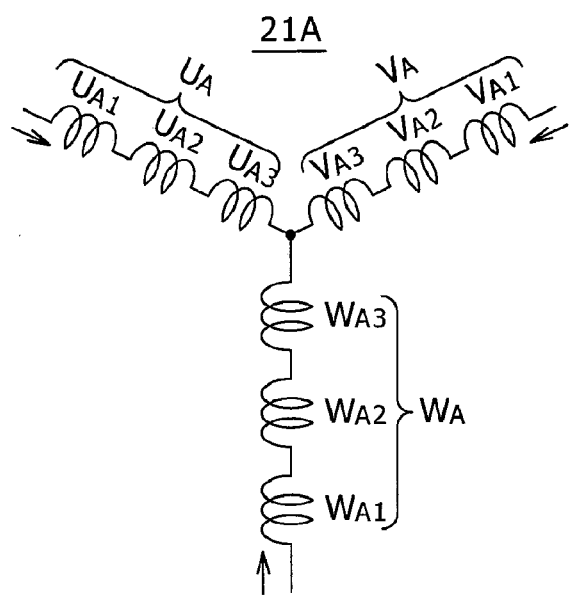
FIG. 3 is a circuit diagram showing a detailed exemplary arrangement of a three-phase winding indicated in FIG. 2.

FIG. 3 shows a detailed exemplary arrangement of the three-phase winding 21A indicated in FIG. 2. Reference characters $U_{A1}$ to $U_{A3}$ designate partial windings of the U-phase winding $U_A$, reference characters $V_{A1}$ to $V_{A3}$ designate partial windings of the V-phase winding $V_A$, and reference characters $W_{A1}$ to $W_{A3}$ designate partial windings of the W-phase winding $W_A$. To indicate corresponding parts shown in FIG. 2, like reference characters are assigned in FIG. 3.

In the three-phase windings 21A to 21H in FIG. 2, each of the U-phase, V-phase, and W-phase windings is divided into three partial windings. For example, in the three-phase winding 21A, the U-phase winding $U_A$ is divided into three partial windings $U_{A1}$ to $U_{A3}$, the V-phase winding $V_A$ is divided into three partial windings $V_{A1}$ to $V_{A3}$, and the W-phase winding $W_A$ is divided into three partial windings $W_{A1}$ to $W_{A3}$ as shown in FIG. 3. Similarly, in the other three-windings 21B to 21H, each of the U-phase, V-phase, and W-phase windings is divided into three partial windings.

The three-phase windings 21A to 21H are disposed on the stator 20 of the rotating electric machine as mentioned above. The following describes a preferred embodiment of a winding structural arrangement of the rotating electric machine in the present invention wherein the three-phase windings 21A to 21H are disposed on the stator 20 of the rotating electric machine.

Figure 1:
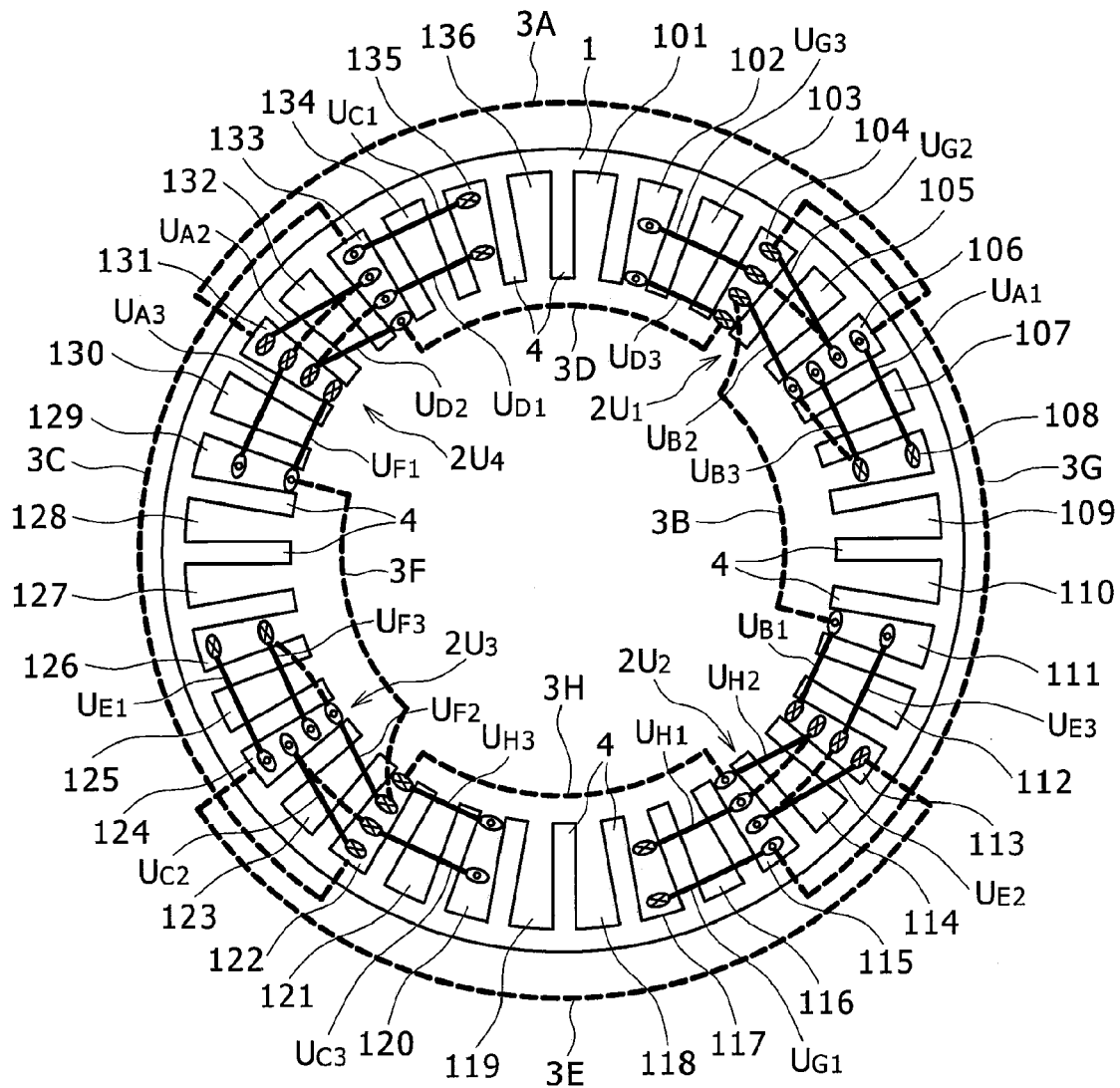
FIG. 1 is a diagram showing a preferred embodiment of a winding structure of a rotating electric machine according to the present invention.

FIG. 1 shows the preferred embodiment of the winding structural arrangement of the rotating electric machine according to the present invention, each winding being arranged to be driven by a drive system of the rotating electric machine as illustrated in FIG. 2. Reference character 1 indicates a stator core, reference characters $2U_1$ to $2U_4$ indicate U-phase winding areas, reference characters 3A to 3H indicate crossover leads, reference character 4 indicates a pair of teeth (teeth pair), and reference characters 101 to 136 indicate slots. In FIGS. 2 and 3, like reference characters designate like or corresponding parts to avoid duplicative description thereof.

In the structural arrangement shown in FIG. 1, a stator core 1 is formed in a cylindrical shape, and a total of 36 slots numbered 101 to 136 are arranged along the inner circumferential face of the stator core 1 so as to extend in the radially inward direction thereof. A pair of protruded parts formed with slots is designated as a pair of teeth 4 (teeth pair), around which each of the U-phase, V-phase, and W-phase windings is wound. The U-phase windings $U_A$ to $U_H$ of each of the three-phase windings 21A to 21H are explained below.

On the inner circumferential face of the stator core 1, there are provided four U-phase winding areas $2U_1$ to $2U_4$ which are identical in size and circumferentially equi-spaced from one another (disposed at equally spaced intervals of 90°). Each of the U-phase winding areas $2U_1$ to $2U_4$ is provided with partial windings of each of the U-phase windings $U_A$ to $U_H$ on a predetermined basis. Respective partial windings are wound around a pair of teeth 4; more specifically, respective partial windings of U-phase windings of two different three-phase windings 21 are wound around a pair of teeth 4 formed identically. On each of the U-phase winding areas $2U_1$ to $2U_4$, partial windings of two U-phase windings are provided (i.e., six partial windings are provided since each U-phase winding includes three partial windings: 3×2=6). Hence, the four U-phase winding areas $2U_1$ to $2U_4$ are arranged as indicated by the following expression:

(Number of partial windings of each three-phase winding×Number of three-phase windings)÷Number of partial windings per U-phase winding area (3×8)÷6=4

In FIG. 1, the location of each partial winding is indicated at both-side slots between which two teeth 4 having the partial winding wound therearound are interposed. A terminal of each partial winding into which a current flows is represented by the symbol of an oval having "x" therein, and a terminal of the partial winding out of which a current flows is represented by the symbol of an oval having "o" therein. Further, in the arrangement shown in FIG. 1, slots 101, 102, ..., 136 are disposed circumferentially in succession starting at the uppermost position of the figure. For example, the location of the partial winding $U_{A1}$ of the U-phase winding $U_A$ is indicated at a pair of slots 108 and 106 with inclusion of the direction of current flow. That is, the partial winding $U_{A1}$ is wound around a pair of teeth interposed between slots 108 and 106, and a current flows inwardly on the slot-108 side and outwardly on the slot-106 side.

With regard to the U-phase winding $U_A$, the partial winding $U_{A1}$ thereof is disposed at slots 108 and 106. A terminal at slot 106 of the partial winding $U_{A1}$ is connected via a crossover lead 3A to a terminal at slot 131 of a divided wire $U_{A2}$, which is disposed at slots 131 and 133. Further, a terminal at slot 133 of the divided wire $U_{A2}$ is connected via a crossover lead 3A (indicated by the broken line, with no reference character) to a terminal at slot 131 of a divided wire $U_{A3}$, which is disposed at slot 131 and 129. That is, the partial winding $U_{A1}$ of the U-phase winding $U_A$ is disposed at slots 108 and 106, the divided wire $U_{A2}$ is disposed at slots 131 and 133, the divided wire $U_{A3}$ is disposed at slots 131 and 129, and the crossover leads 3A are disposed to provide successive connections thereof.

Then, with regard to the U-phase winding $U_B$, the partial winding $U_{B1}$ thereof is disposed at slots 113 and 111. A terminal at slot 111 of the partial winding $U_{B1}$ is connected via a crossover lead 3B to a terminal at slot 104 of a divided wire $U_{B2}$, which is disposed at slots 104 and 106. Further, a terminal at slot 106 of the divided wire $U_{B2}$ is connected via a crossover lead 3B (indicated by the broken line, with no reference character) to a terminal at slot 108 of a divided wire $U_{B3}$, which is disposed at slot 108 and 106. That is, the partial winding $U_{B1}$ of the U-phase winding $U_B$ is disposed at slots 113 and 111, the divided wire $U_{B2}$ is disposed at slots 104 and 106, the divided wire $U_{B3}$ is disposed at slots 108 and 106, and the crossover leads 3B are disposed to provide successive connections thereof.

Furthermore, with regard to the U-phase winding $U_C$, the partial winding $U_{C1}$ thereof is disposed at slots 135 and 133. A terminal at slot 133 of the partial winding $U_{C1}$ is connected via a crossover lead 3C to a terminal at slot 122 of a divided wire $U_{C2}$, which is disposed at slots 122 and 124. Further, a terminal at slot 124 of the divided wire $U_{C2}$ is connected via a crossover lead 3C (indicated by the broken line, with no reference character) to a terminal at slot 122 of a divided wire $U_{C3}$, which is disposed at slot 122 and 120. That is, the partial winding $U_{C1}$ of the U-phase winding $U_C$ is disposed at slots 135 and 133, the divided wire $U_{C2}$ is disposed at slots 122 and 124, the divided wire $U_{C3}$ is disposed at slots 122 and 120, and the crossover leads 3C are disposed to provide successive connections thereof.

The remaining U-phase windings are arranged in the same fashion as mentioned above. Lastly, with regard to the U-phase winding $U_H$, the partial winding $U_{H1}$ thereof is disposed at slots 117 and 115. A terminal at slot 115 of the partial winding $U_{H1}$ is connected via a crossover lead 3H (indicated by the broken line, with no reference character) to a terminal at slot 113 of a divided wire $U_{H2}$, which is disposed at slots 113 and 115. Further, a terminal at slot 115 of the divided wire $U_{H2}$ is connected via a crossover lead 3H to a terminal at slot 122 of a divided wire $U_{H3}$, which is disposed at slot 122 and 120. That is, the partial winding $U_{H1}$ of the U-phase winding $U_H$ is disposed at slots 117 and 115, the divided wire $U_{H2}$ is disposed at slots 113 and 115, the divided wire $U_{H3}$ is disposed at slots 122 and 120, and the crossover leads 3H are disposed to provide successive connections thereof.

In the winding structure described above, on each of the U-phase winding areas $2U_1$ to $2U_4$, there are provided four partial windings at two slots formed at every other position (with the center slot position skipped over), i.e., there are provided four partial windings at slots 104 and 106 on the U-phase winding area $2U_1$, four partial windings at slots 113 and 115 on the U-phase winding area $2U_2$, four partial windings at slots 122 and 124 on the U-phase winding area $2U_3$, and four partial windings at slots 131 and 133 on the U-phase winding area $2U_4$. Further, there are also provided four partial windings at both-side slots each being located next but one to each of the above-noted four partial windings, i.e., there are provided four partial windings at slots 102 and 108 on the U-phase winding area $2U_1$, four partial windings at slots 111 and 117 on the U-phase winding area $2U_2$, four partial windings at slots 120 and 126 on the U-phase winding area $2U_3$, and four partial windings at slots 129 and 135 on the U-phase winding area $2U_4$.

FIG. 4 shows the locations of partial windings of the U-phase windings $U_A$ to $U_H$ of respective UVW-phase windings. As shown in FIG. 4, "a first series" includes the partial windings $U_{A1}$, $U_{B1}$, $U_{C1}$, ..., $U_{H1}$, each corresponding to a first location with respect to the input side of each of the U-phase windings $U_A$ to $U_H$, "a second series" includes the partial windings $U_{A2}$, $U_{B2}$, $U_{C2}$, $U_{H2}$, each corresponding to a second location with respect thereto, and "a third series" includes the partial windings $U_{A3}$, $U_{B3}$, $U_{C3}$, ..., $U_{H3}$, each corresponding to a third location with respect thereto.

FIG. 5 shows overlapping partial (divided) windings of each of the U-phase windings $U_A$ to $U_H$. The overlapping partial windings mentioned herein means two windings wound around the same pair of teeth corresponding to the same pair of slot positions. In FIG. 5, the partial windings overlapping with respective partial windings of each of the U-phase windings $U_A$ to $U_H$ are indicated, and "a first series", "a second series", and "a third series" are the same as those shown in FIG. 4.

With regard to the U-phase winding $U_A$ in FIG. 5, the partial winding $U_{A1}$ included in the first series thereof is disposed to overlap with the partial winding $U_{B3}$ included in the third series of the U-phase winding $U_B$, the partial winding $U_{A2}$ included in the second series thereof is disposed to overlap with the partial winding $U_{D2}$ included in the second series of the U-phase winding $U_D$, and the partial winding $U_{A3}$ included in the third series thereof is disposed to overlap with the partial winding $U_{F1}$ included in the first series of the U-phase winding $U_F$. In this manner, the partial windings $U_{A1}$, $U_{A2}$, and $U_{A3}$ of the U-phase winding $U_A$ are formed to overlap with different U-phase partial windings, respectively.

The remaining U-phase windings $U_B$ to $U_H$ are arranged in the same fashion as mentioned above, i.e., the partial windings thereof are formed to overlap with different U-phase partial windings, respectively.

In the winding arrangement described above, the direction of a current flowing through each partial winding at a pair of slot positions is opposite to that at a pair of slot positions adjacent thereto. For example, in each of the partial windings $U_{A1}$ and $U_{B3}$ located at a pair of slots 108 and 106, a current is fed so as to flow inwardly at slot 108 and to flow outwardly at slot 106. In each of the partial windings $U_{G2}$ and $U_{B2}$ located at a pair of slots 106 and 104 adjacent to the above pair of slots 108 and 106, a current is fed so as to flow inwardly at slot 104 opposed to slot 108 and to flow outwardly at slot 106. Hence, the direction of a magnetic flux at a pair of teeth at slots 106 and 108 (teeth pair) is opposite to that at a pair of teeth at slots 104 and 106 (teeth pair), and a magnetic path is formed by these two teeth pairs. The same condition as mentioned above is also provided to a pair of slots 102 and 104 and a pair of slots 104 and 106, forming a magnetic path by two teeth pairs corresponding thereto.

Thus, magnetic paths are formed on the U-phase winding area $2U_1$. On the U-phase winding area $2U_2$, magnetic paths are formed by a teeth pair at slots 113 and 115, a teeth pair at slots 111 and 113, and a teeth pair at slots 115 and 117 in the same manner. Further, on the U-phase winding areas $2U_3$ and $2U_4$, magnetic paths are formed in the same manner.

The U-phase windings $U_A$ to $U_H$ are arranged as described above, and the V-phase windings $V_A$ to $V_H$ and the W-phase windings $W_A$ to $W_H$ are also arranged similarly.

Figure 6:
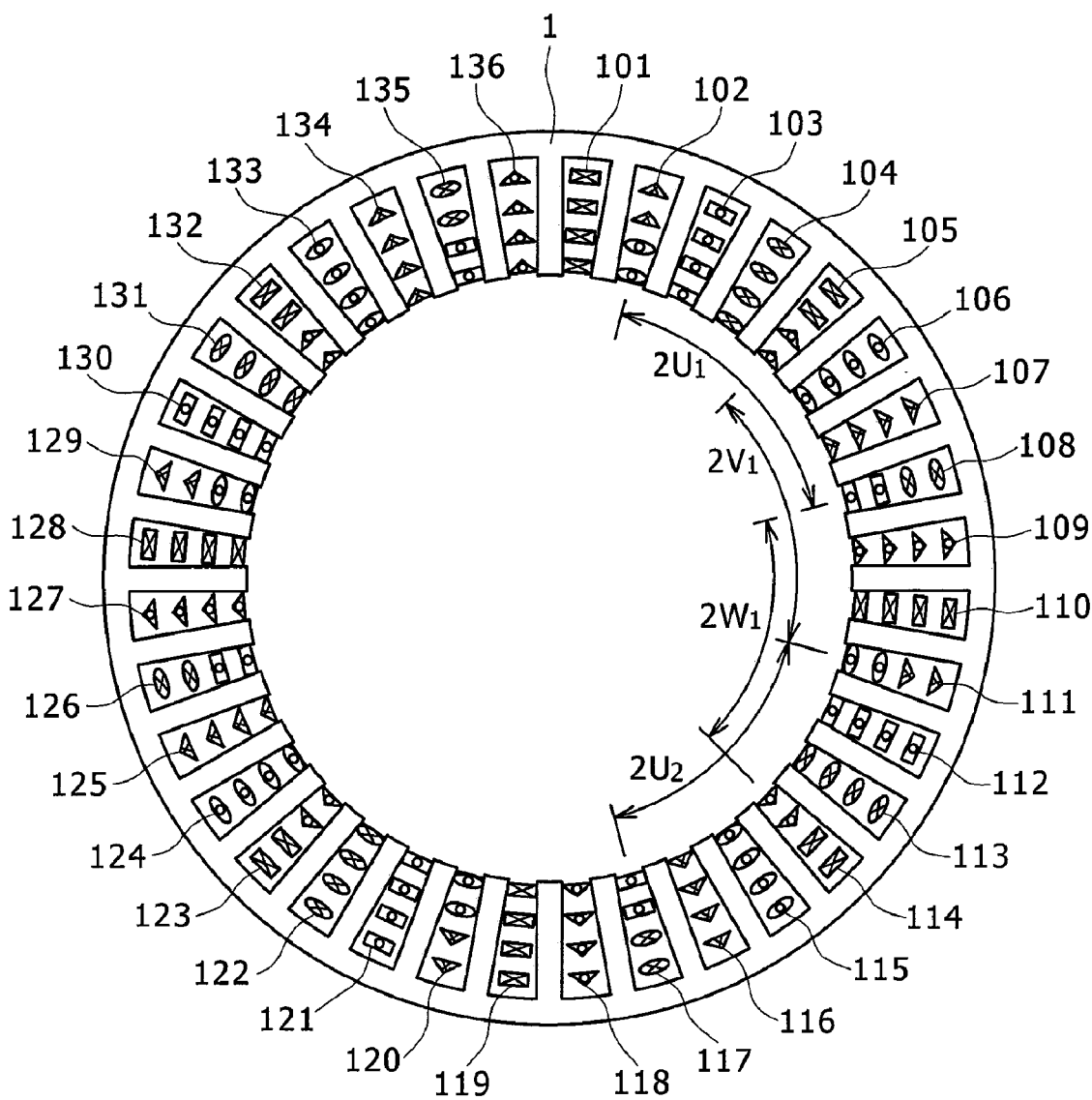
FIG. 6 is a diagram showing a winding arrangement in which all the U-phase, V-phase, and W-phase windings in FIG. 1 are disposed on a stator core.
Figure 6:
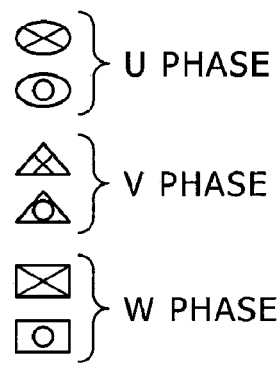

FIG. 6 shows a winding arrangement in which all the U-phase windings $U_A$ to $U_H$, V-phase windings $V_A$ to $V_H$, and W-phase windings $W_A$ to $W_H$ are disposed on the stator core 1. Reference characters $2V_1$, $2V_2$, $2V_3$, and $2V_4$ indicate V-phase winding areas, and reference characters $2W_1$, $2W_2$, $2W_3$, and $2W_4$ indicate W-phase winding areas. To indicate corresponding parts shown in FIG. 1, like reference characters are assigned in FIG. 5, and no duplicative description thereof is given here. It is to be noted that reference characters of V-phase winding areas $V_2$ to $V_4$ and those of W-phase winding areas $W_2$ to $W_4$ are not indicated in FIG. 6.

Figure 7:
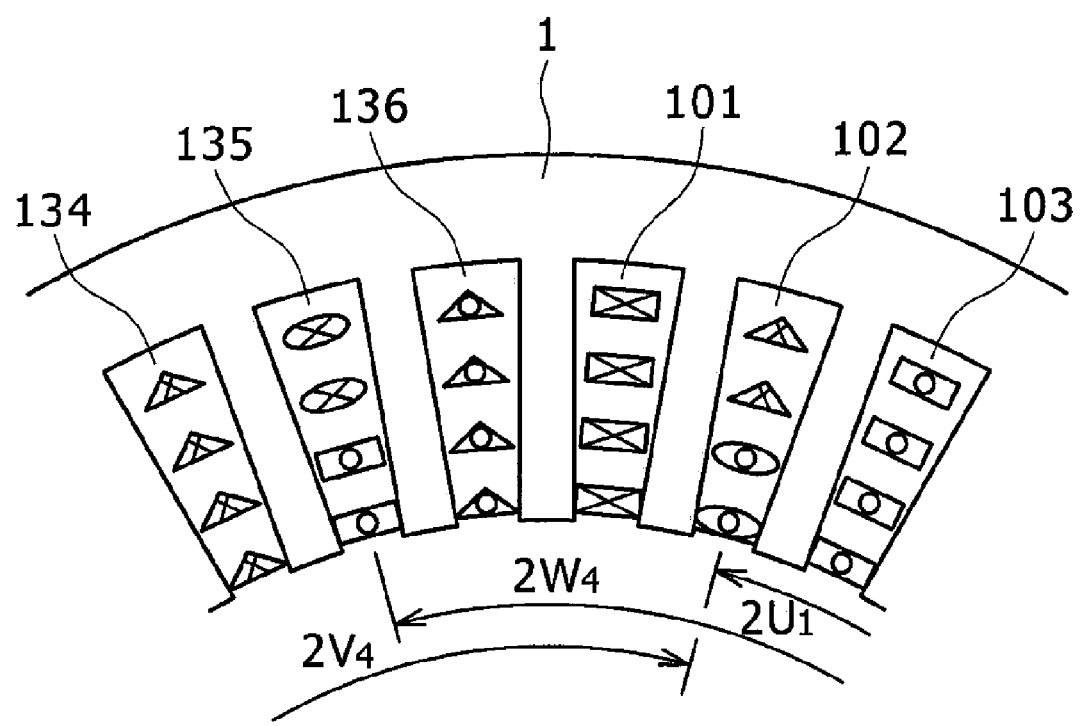
FIG. 7 is a fragmentary enlarged view of some slots shown in FIG. 6.

FIG. 7 shows a fragmentary enlarged view of slots 134 to 136 and 101 to 103 illustrated in FIG. 6.

In FIG. 7 showing a part of the winding arrangement in which the partial windings of all the three-phase windings 21A to 21H are disposed on the stator core 1, a total of four partial windings are disposed at each slot on each U-phase winding area as described in the foregoing. Accordingly, in the case of the U-phase winding $U_A$, four partial windings thereof are disposed per slot. Since a total of 72 partial windings of the three-phase windings 21A to 21H are disposed (3×3×8=72) and two slots are used per partial winding, a total of 36 slots are provided on the stator core 1 (72×2÷4=36).

The V-phase winding areas $2V_1$, $2V_2$, $2V_3$, and $2V_4$ and the W-phase winding areas $2W_1$, $2W_2$, $2W_3$, and $2W_4$ also have a partial winding arrangement similar to that on the U-phase winding areas $2U_1$, $2U_2$, $2U_3$, and $2U_4$. Since these U-phase winding areas $2U_1$, $2U_2$, $2U_3$, and $2U_4$ are provided at intervals of 90° (36 slots÷4=9 slots), the V-phase winding areas $2V_1$, $2V_2$, $2V_3$, and $2V_4$ are shifted from the U-phase winding areas $2U_1$, $2U_2$, $2U_3$, and $2U_4$ by three slot positions (9 slots÷3=3 slots). Correspondingly, the W-phase winding areas $2W_1$, $2W_2$, $2W_3$, and $2W_4$ are also shifted from the V-phase winding areas $2V_1$, $2V_2$, $2V_3$, and $2V_4$ by three slot positions (i.e., the W-phase winding areas $2W_1$, $2W_2$, $2W_3$, and $2W_4$ are shifted from the U-phase winding areas $2U_1$, $2U_2$, $2U_3$, and $2U_4$ by six slot positions).

In the winding arrangement shown in FIG. 6, the U-phase winding area $2U_1$ is provided in the range of slots 102 to 108, the V-phase winding area $2V_1$ is provided in the range of slots 105 to 111, and the W-phase winding area $2W_1$ is provided in the range of slots 108 to 114. Subsequent to the V-phase winding area $2V_1$, the U-phase winding area $2U_2$ is provided in the range of slots 111 to 117. Thus, the V-phase winding area $2V_2$, W-phase winding area $2W_2$, U-phase winding area $2U_3$, and so on are also provided in the same manner.

In the arrangement mentioned above, the U-phase winding area overlaps with each of the V-phase and W-phase winding areas on a three-slot basis, the V-phase winding area overlaps with each of the U-phase and W-phase winding areas on a three-slot basis, and the W-phase winding area overlaps with each of the V-phase and U-phase winding areas on a three-slot basis. Each partial winding is wound around a pair of teeth in such a manner that no part thereof is wound through an interleaving slot sandwiched between the pair of teeth as demonstrated in the foregoing, and each of both-end slots of each winding area is provided with two partial windings. In repetition of this pattern of winding arrangement, there are provided four partial windings at each slot. Accordingly, the partial windings of all the phases included in the three-phase windings 21A to 21H are disposed on the inner circumferential face of the stator core 1 in an equally distributed form.

According to the preferred embodiment mentioned above, the stator core 1 has eight three-phase windings 21A to 21H each of which is driven by an individual servo amplifier, thereby making it possible to provide a rotating electric machine having a large output. In these three-phase windings 21A to 21H, each of the U-phase, V-phase, and W-phase windings is divided into three partial windings, and identical-phase partial windings of the three-phase windings 21A to 21H are distributively arranged on four winding areas (U-phase winding areas $2U_1$ to $2U_4$, V-phase winding areas $2V_1$ to $2V_4$, and W-phase winding areas $2W_1$ to $2W_4$) so that identical-phase partial windings of two different three-phase windings are overlappingly disposed at each same location on each winding area. Thus, the total number of slots on the stator core 1 can be decreased, thereby enabling a reduction in size of the stator core 1, i.e., the rotating electric machine, without the need to reduce the dimensions of slots or teeth in particular.

In the rotating electric machine disclosed in Japanese Patent Application No. 2005-86879 cited in the foregoing, two three-phase windings are employed, and the winding of each phase of these three-phase windings is divided into two partial windings. In this winding structure, a stator core having a total of 48 slots is used. To provide a rotating electric machine having a larger output by increasing the number of three-phase windings or the number of partial windings, it is required to increase the number of slots substantially. For circumventing an increase in size due to an increase in the number of slots, it is inevitable to reduce the dimensions of slots or teeth accordingly, resulting in a significant restriction being imposed on the provision of a rotating electric machine having a larger output. This disadvantage in the technique disclosed in Japanese Patent Application No. 2005-86879 can be eliminated according to the above-mentioned preferred embodiment of the present invention.

In the winding arrangement of each phase of each of the three-phase windings 21A to 21H, each partial winding on each winding area is overlappingly disposed at the same location as that of the partial winding of the identical-phase winding of another three-phase winding (for example, on the U-phase winding area $2U_1$, the partial winding $U_{A1}$ of the U-phase winding $U_A$ of the three-phase winding 21A is overlappingly disposed at the same location of slots 108 and 106 as that of the partial winding $U_{B3}$ of the U-phase winding $U_B$ of the three-phase winding 21B). As shown in FIG. 5, in the arrangement of the three partial windings of the identical-phase windings of the three-phase windings (first to third series), the partial windings of the identical-phase windings of different three-phase windings are overlappingly disposed on each winding area. Although there may occur interference on the identical-phase windings of different three-phase windings, this interference is dispersed to the identical-phase windings of the three-phase windings that are different mutually on a ⅓ basis owing to ⅓ partial windings with respect to the entire phase winding arrangement.

In other words, regarding the U-phase winding $U_A$ of the three-phase winding 21A indicated in FIG. 5, for example, the U-phase winding $U_A$ may be subjected to interference from the U-phase winding of the other three-phase windings. That is, interference may occur on the partial winding $U_{B3}$ of the U-phase winding $U_B$ of the three-phase winding 21B, the partial winding $U_{D2}$ of the U-phase winding $U_D$ of the three-phase winding 21D, and the partial winding $U_{F1}$ of the U-phase winding $U_F$ of the three-phase winding 21F.

In a situation where the U-phase windings $U_A$ to $U_H$ of the three-phase windings 21A to 21H are supplied with a current for driving, a magnetic flux is produced on each of the U-phase windings $U_B$, $U_D$, and $U_F$ of the three-phase windings 21B, 21D, and 21F. The magnetic flux thus produced on each U-phase winding passes through the U-phase windings of the other three-phase windings, thereby inducing a voltage on the U-phase windings to cause interference. More specifically, on the partial winding $U_{A1}$ of the U-phase winding $U_A$, a voltage is induced by the partial winding $U_{B3}$ disposed overlappingly therewith to the extent of ⅓ of a level applied in the case of the entire overlapping of the U-phase winding $U_B$. Further, on the partial winding $U_{A2}$ of the U-phase winding $U_A$, a voltage is induced by the partial winding $U_{D2}$ disposed overlappingly therewith to the extent of ⅓ of a level applied in the case of the entire overlapping of the U-phase winding $U_D$. Still further, on the partial winding $U_{A3}$ of the U-phase winding $U_A$, a voltage is induced by the partial winding $U_{F1}$ disposed overlappingly therewith to the extent of ⅓ of a level applied in the case of the entire overlapping of the U-phase winding $U_F$.

Thus, in the arrangement in which the partial windings of the identical-phase windings of different three-phase windings are overlappingly disposed as mentioned above, although interference may occur on these identical-phase windings, the extent of interference from another windings is reduced to ⅓. Since the identical-phase windings are driven by the individual servo amplifiers associated therewith, a complete coincidence does not occur in the rise timing of drive currents to the identical-phase windings of different three-phase windings, i.e., a certain degree of shift is provided in the rise timing of these drive currents. Hence, in interference, no coincidence occurs in the rise timing of voltages induced by the partial windings of the identical-phase windings of the three-phase windings (three different windings). That is, a voltage reduced to ⅓ is induced in interference, resulting in a reduction in interference from another windings.

Figure 8:
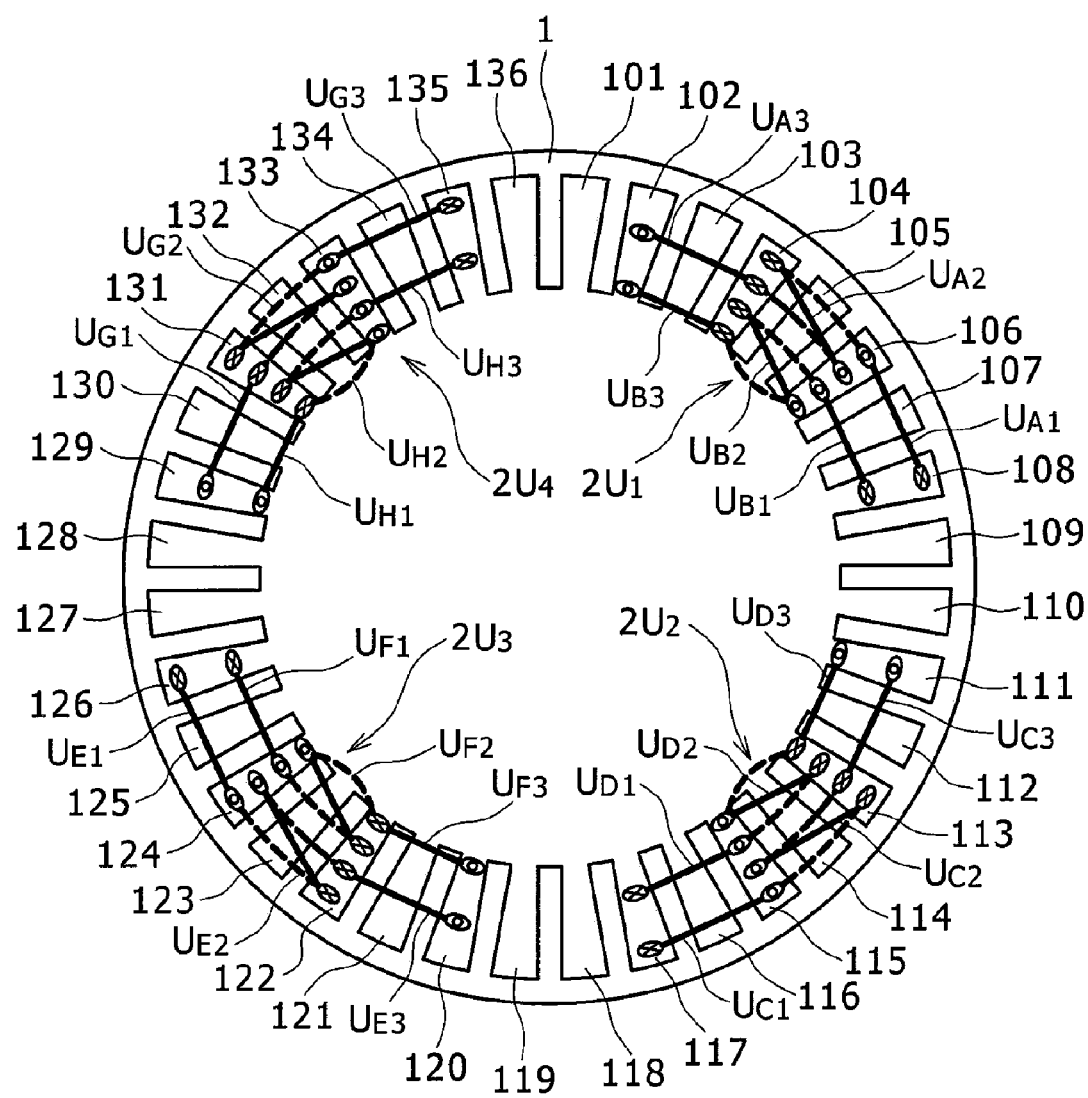
FIG. 8 is a diagram showing a comparative example for reference to the preferred embodiment illustrated in FIG. 1.

FIG. 8 shows a comparative example regarding the interference mentioned above. To indicate corresponding parts shown in FIG. 1, like reference characters are assigned in FIG. 8.

The comparative example shown in FIG. 8 is arranged to have a configuration for reference to the preferred embodiment illustrated in FIGS. 2 and 3. In FIG. 8, the wiring arrangements of the U-phase windings $U_A$ to $U_H$ of each of the three-phase windings 21A to 21H are indicated in particular. On each of the U-phase winding areas $2U_1$ to $2U_4$, two U-phase windings of different three-phase windings are disposed. That is, on the U-phase winding area $2U_1$, the partial winding $U_{A1}$ of the U-phase winding $U_A$ and the partial winding $U_{B1}$ of the U-phase winding $U_B$ are disposed at slots 108 and 106, the partial winding $U_{A2}$ of the U-phase winding $U_A$ and the partial winding $U_{B2}$ of the U-phase winding $U_B$ are disposed at slots 104 and 106, and the partial winding $U_{A3}$ of the U-phase winding $U_A$ and the partial winding $U_{B3}$ of the U-phase winding $U_B$ are disposed at slots 104 and 102. In this manner, the partial windings of the U-phase winding $U_A$ and the U-phase winding $U_B$ are disposed overlappingly (at the same pair of slots). Similar partial winding arrangements are made on the other U-phase winding areas $2U_2$ to $2U_4$. On the U-phase winding area $2U_2$, the partial windings $U_{C1}$ to $U_{C3}$ of the U-phase winding $U_C$ and the partial windings $U_{D1}$ to $U_{D3}$ of the U-phase winding $U_D$ are disposed overlappingly. On the U-phase winding area $2U_3$, the partial windings $U_{E1}$ to $U_{E3}$ of the U-phase winding $U_E$ and the partial windings $U_{F1}$ to $U_{F3}$ of the U-phase winding $U_F$ are disposed overlappingly, and on the U-phase winding area $2U_4$, the partial windings $U_{G1}$ to $U_{G3}$ of the U-phase winding $U_G$ and the partial windings $U_{H1}$ to $U_{H3}$ of the U-phase winding $U_H$ are disposed overlappingly.

On the V-phase winding area and the W-phase winding area, winding arrangements are made in the same fashion as mentioned above. The positional relationship of these U-phase, V-phase, and W-phase winding areas is also similar to that of the preferred embodiment shown in FIG. 1.

In the above-mentioned winding structure, since the positional relationship of the U-phase, V-phase, and W-phase winding areas and the configurational relationship of the partial windings on each winding area are similar to those of the preferred embodiment shown in FIG. 1, the number of slots (the number of teeth) on a stator core 1 is the same as that in the preferred embodiment shown in FIG. 1, i.e., a total of 36 slots are provided on the stator core 1 shown in FIG. 8, also. Although it appears that a reduction in size of a rotating electric machine having a multiplicity of three-phase windings can be made, the partial windings of two identical-phase windings are disposed overlappingly at each same location on each phase winding area of the stator core 1, resulting in a considerable degree of interference thereon.

FIGS. 9A to 9C are explanatory diagrams regarding interference in the above-mentioned winding structure of the comparative example shown in FIG. 8. Reference characters 30 to 33 indicate stray inductances, and reference character $U_{AB}$ indicates an equivalent coupling winding. To indicate corresponding parts shown in the preceding figures, like reference characters are assigned in FIGS. 9A to 9C, and no duplicative description thereof is given here. With reference to FIGS. 9A to 9C, the following describes the U-phase winding area $2U_1$ indicated in FIG. 8.

In FIG. 9A, there is shown a drive circuit for the U-phase windings $U_A$ and $U_B$ disposed on the U-phase winding area $2U_1$. From the servo amplifier 10A, a current is fed to the U-phase winding $U_A$ on the U-phase winding area $2U_1$ through a wiring having stray inductances 30 and 31. This current produces a magnetic flux on the U-phase winding $U_A$, and the magnetic flux thus produced passes through the U-phase winding $U_B$ disposed overlappingly with the U-phase winding $U_A$ to induce a voltage on the U-phase winding $U_B$, causing interference between the U-phase windings $U_A$ and $U_B$.

Referring to FIG. 9B, a voltage at the U-phase winding $U_A$ under the above condition is designated as "A", a coefficient of coupling of the U-phase winding $U_A$ and U-phase winding $U_B$ by the magnetic flux is designated as "k", and a voltage induced on the U-phase winding $U_B$ is designated as "a". The relationship of these parameters is expressed by the equation "a=kA". On the assumption that the coefficient of coupling "k" is substantially 1, this equation is rewritten as "a≈A". Thus, as shown in FIG. 9B, the voltage "a" that is approximately equal to the voltage "A" is induced at the U-phase winding $U_B$. For distinctly demonstrating individual voltage levels, the time axis (horizontal axis) is widened in FIG. 9B. It is to be noted that the voltage "a" induced at the U-phase winding $U_B$ is caused by a change in magnetic flux at the start of current feeding to the U-phase winding $U_A$.

Referring to FIG. 9C, there is shown an equivalent circuit of the U-phase winding $U_A$ and U-phase winding $U_B$ in a situation where a current is fed to the U-phase winding $U_A$. That is, the U-phase windings $U_A$ and $U_B$ are represented in combination as an equivalent coupling winding $U_{AB}$. When a drive voltage is applied to the U-phase winding $U_A$ from the servo amplifier 10A, a voltage equivalent to the drive current is imposed on the other servo amplifier 10B as a disturbance voltage. Since this disturbance voltage exceeds an upper-limit voltage level controllable by the servo amplifier 10B, the servo amplifier 10B is deprived of controllability thereof. When a drive voltage is applied to the U-phase winding $U_B$ from the servo amplifier 10B, the same condition also occurs to cause the servo amplifier 10A to be deprived of controllability thereof.

By way of contrast, in the aforementioned preferred embodiment shown in FIG. 1, for each of the partial windings $U_{A1}$, $U_{A2}$ and $U_{A3}$ formed by dividing the U-phase winding $U_A$ and for each of the partial windings $U_{B1}$, $U_{B2}$ and $U_{B3}$ formed by dividing the U-phase winding $U_B$, an overlapping partial winding arrangement is made in such a fashion that the partial windings of different U-phase windings are disposed overlappingly. Further, on the different U-phase windings, a certain degree of shift is provided in the rise timing of drive currents thereto. Hence, a disturbance voltage induced on each partial winding of the U-phase winding $U_B$ has an amplitude that is ⅓ of a level applied in the case of the entire overlapping arrangement of the U-phase windings demonstrated in the comparative example. In addition, since a certain degree of shift is provided in the generation timing of induced voltages, the induced voltages are not summed up. Under this condition, a disturbance due to interference is reduced to ⅓. Thus, the degree of disturbance imposed on each servo amplifier due to interference is decreased significantly, thereby ensuring normal controllability of each servo amplifier.

While the preferred embodiment proposed herein has been described as an arrangement in which eight three-phase windings are provided and each phase winding thereof is divided into three partial windings, it is to be understood that the preferred embodiment is illustrative only and is not intended to limit the scope of the present invention. There may also be provided such an arrangement that a plurality of multiphase windings are used and each phase winding thereof is divided into a proper number of partial windings.

Further, it is to be understood that the present invention is not limited to such conditions of the preferred embodiment that the number of winding areas provided for each phase is four, and that the number of partial windings of identical-phase windings disposed overlappingly at each same location on the stator core is two.

As regards industrial applicability, the present invention is applicable to any kind of rotating electric machine to be designed for meeting such requirements as larger output, smaller size, and lower moment of inertia.

What is claimed is:

1. A rotating electric machine, comprising:
a stator core; and
a plurality of multiphase windings formed thereon;
wherein each phase winding of each multiphase winding is divided into a plurality of partial windings, which are disposed at different locations on the stator core;
wherein, at each location on the stator core for partial winding disposition, one of the plurality of partial windings is disposed overlappingly with a partial winding of different and identical phase partial windings;
wherein a plurality of winding areas each including a plurality of locations on the stator core for partial winding disposition are provided at equally spaced intervals; and
wherein each phase winding of the multiphase windings is so provided that the partial windings thereof are distributively arranged on different winding areas.

2. The rotating electric machine according to claim 1, wherein, at each location on the stator core for partial winding disposition, a plurality of partial windings are wound through a pair of slots between which a predetermined number of teeth are interposed.

3. The rotating electric machine according to claim 2, wherein the stator core has a total of 36 slots, and a total of eight three-phase windings are provided as multiphase windings.

4. The rotating electric machine according to claim 2, wherein each phase winding includes three partial windings.

5. The rotating electric machine according to claim 1, wherein each of the winding areas includes a plurality of locations where a plurality of partial windings of different-phase windings are disposed.

6. The rotating electric machine according to claim 1, wherein the stator core has a total of 36 slots, and a total of eight three-phase windings are provided as multiphase windings.

7. The rotating electric machine according to claim 1, wherein each phase winding includes three partial windings.

8. The rotating electric machine according claim 1, wherein the stator core has a total of 36 slots, and a total of eight three-phase windings are provided as multiphase windings.

9. The rotating electric machine according to claim 1, wherein each phase winding includes three partial windings.

10. A rotating electric machine, comprising:
a stator core; and
a plurality of multiphase windings formed thereon;
wherein each phase winding of each multiphase winding is divided into a plurality of partial windings, which are disposed at different locations on the stator core;
wherein, at each location on the stator core for partial winding disposition, one of the plurality of partial windings is disposed overlappingly with a partial winding of different and identical phase partial windings;
wherein, at each location on the stator core for partial winding disposition, a plurality of partial windings are wound through a pair of slots between which a predetermined number of teeth are interposed;
wherein a plurality of winding areas each including a plurality of locations on the stator core for partial winding disposition are provided at equally spaced intervals; and
wherein each phase winding of the multiphase windings is so provided that the partial windings thereof are distributively arranged on different winding areas.

11. The rotating electric machine according to claim 10, wherein each of the winding areas includes a plurality of locations where a plurality of partial windings of different-phase windings are disposed.

12. The rotating electric machine according to claim 10, wherein the stator core has a total of 36 slots, and a total of eight three-phase windings are provided as multiphase windings.

13. The rotating electric machine according to claim 10, wherein each phase winding includes three partial windings.

* * * * *